United States Patent Office 3,145,226
Patented Aug. 18, 1964

3,145,226
PROCESS FOR PREPARING ORGANIC THIOLSULFONATES
Rudi F. W. Rätz, Hamden, Conn., assignor to Olin Mathieson Chemical Corporation, New Haven, Conn., a corporation of Virginia
No Drawing. Filed Mar. 1, 1963, Ser. No. 262,231
6 Claims. (Cl. 260—453)

This invention relates to a novel process for preparing organic thiolsulfonates, and more particularly it relates to a process for preparing compounds having the formula $$RSO_2SR'$$
(I)

wherein R is selected from the class consisting of an alkyl group having 1–18 carbon atoms, a cycloaliphatic group, a phenyl group and a substituted phenyl group and wherein R' is selected from the class consisting of a lower alkyl group and a phenyl group.

Compounds having the Formula I have previously been prepared by a number of methods. For example, they can be prepared by the oxidation of disulfides with dilute nitric acid or peracetic acid, by the alkylation of alkali alkane thiolsulfonates or by oxidation of methanesulfenyl chloride with concentrated nitric acid. Some of these thiolsulfonates, especially those in which R represents a substituted aromatic group or R' represents a chlorinated aliphatic group, are known to have antimicrobial properties. Thiolsulfonates of the Formula I have also been found to be particularly useful as solvents for the selective extraction of aromatic hydrocarbons from various petroleum oils.

The use of strong oxidizing agents such as nitric acid and peracetic acid in the aforementioned oxidation processes can cause some difficulties especially where other groups sensitive to oxidation are present in the beginning intermediate. A satisfactory oxidation process which can be performed under mild conditions is therefore desirable for the preparation of thiolsulfonates.

The primary object of this invention was to provide an improved process for the preparation of organic thiolsulfonates having the Formula I. Another object of this invention was to provide a simple and efficient oxidation process for the conversion of α-chloromethyl thioethers to thiolsulfonates of high purity. Another object of this invention was to provide an oxidation process for the preparation of thiolsulfonates from α-chloromethyl thioethers which would be performed under mild conditions. Other objects of this invention will be obvious from the following discussion.

These objects have been accomplished in accordance wih the present invention. It has been found that thiolsulfonates having the Formula I can be prepared in high purity and good yield by the reaction of various α-chloromethyl thioethers with organic sulfoxides. The oxidation process described herein is characterized by very mild reaction conditions. Furthermore, cheap and readily available sulfoxides can be used in the process of this invention as the necessary oxidizing agents.

The overall equation by which thiolsulfonates are obtained in accordance with the process of this invention can be apparently represented by the following equation wherein the simplest representative, methyl methanethiolsulfonate is prepared:

$$CH_3SCH_2Cl + 3(CH_3)_2S=O \rightarrow CH_3SO_2SCH_3 + (CH_3)_3S^+Cl^- + CH_2O + (CH_3)_2S$$

A wide variety of α-chloromethyl thioethers can be utilized as intermediates in the process described herein. Chloromethyl thioethers which contain substituents on the methylene group as well as thioethers having no groups substituted on the methylene group can be prepared according to known practice by the reaction of mercaptans with a number of aldehydes and ketones such as formaldehyde, acetaldehyde, benzaldehyde and acetone in the presence of HCl. In the practice of this invention, the preferred α-chloromethyl thioether reactants are those prepared by the reaction of mercaptans with formaldehyde, thus obtaining products containing no substituted groups on the methylene portion of the molecule. Some of the mercaptans which can be chloromethylated to yield intermediates useful herein are listed in the following discussion.

In general, alkyl mercaptans having from 1–18 carbon atoms are suitable. For example, methyl mercaptan, ethyl mercaptan, n-propyl mercaptan, isopropyl mercaptan, n-butyl mercaptan, isobutyl mercaptan, n-amyl mercaptan, octyl mercaptan, dodecyl mercaptan, and octadecyl mercaptan can be converted to a thioether as described above and used as intermediates in this novel process although it is preferred to utilize thioethers prepared by the chloromethylation of alkyl mercaptans having from 1–4 carbon atoms.

Benzenethiol ($C_6H_5SH$) and other mercaptans containing a phenyl group with negative substituents such as halogen atoms, nitro groups, and the like attached to the phenyl group and also amino groups attached to the phenyl group may be chloromethylated to the corresponding thioether and used in this process. Examples of such other mercaptans are o-thiocresol, m-thiocresol, p-thiocresol, 2-chlorothiophenol, 3-chlorothiophenol, 4-chlorothiophenol, 2,5-dichlorothiophenol, 2-nitrothiophenol, 4-nitrothiophenol, and 2,4-dinitrothiophenol.

Cycloaliphatic mercaptans such as cyclopentyl mercaptan and particularly cyclohexyl mercaptan can also be chloromethylated to give thioethers suitable for use in this novel oxidation process.

Among the organic sulfoxides which may be used in the practice of this invention are alkyl sulfoxides, as for example dimethylsulfoxide, diethylsulfoxide, dipropylsulfoxide and dibutylsulfoxide as well as methyl-ethyl sulfoxide. Diphenylsulfoxide can also be used as a reactant in the process. However, the preferred process embodiment utilizes the lower alkyl sulfoxides represented by dimethylsulfoxide and diethylsulfoxide.

The reaction between the thioethers and the organic sulfoxides can be performed in the absence of solvents or diluents. It appears that a stoichiometric amount of the sulfoxide is three moles for each mole of thioether present. However, excess sulfoxide can be advantageously employed as a solvent as shown in the accompanying examples.

The oxidation process herein described proceeds at reaction temperatures in the range of 0° C. to 180° C. However, preferred reaction conditions involve the use of a temperature of about 20° C. to 75° C.

The following examples are representative of the novel process described herein. It is to be understood that these examples are illustrative only, and that they are not to be construed as limiting the scope of this invention since obvious process modifications would be apparent to one skilled in the art.

*Example 1*

A solution of 4.30 g. (0.0446 mole) of methyl chloromethyl sulfide in 15.0 g. (0.1923 mole) of anhydrous dimethylsulfoxide was placed in a 100 ml. flask. The clear solution was allowed to stand for four hours at room temperature. At this point, the solution had changed to a gelatinous mass. The material was allowed to stand overnight, and no further visible change occurred during this period. The gel material was extracted with three 15 ml. portions of dry chloroform.

After the third extraction, a solid material remained in the reaction flask which was separated by filtration, washed with acetone and dried. This solid was identified as paraformaldehyde, and a total of 1.4 g. was isolated. This amount represents approximately the theoretical amount of this material which would be obtained if complete reaction had occurred.

The combined chloroform extracts were carefully evaporated at 10 mm. (maximum bath temperature 37° C.). After removal of chloroform, there was obtained 4.5 g. of a yellow oil. Vapor phase chromatography analysis on this oil indicated that it contained some dimethylsulfide, dimethylsulfoxide and trace amounts of methyl disulfide. In water the yellow oil gave a strong chloride reaction with silver nitrate. The oil was then subjected to vacuum distillation in a 25 ml. Claisen flask. A chlorine-containing forerun was obtained, but most of the oil distilled at 64° C./0.05 mm.; $n_D^{20}$ 1.5123. This colorless, water-clear oil was absolutely free of chlorine. The infrared spectrum showed strong sulfonyl absorptions at 7.7 and 8.85μ, but no S=O absorption. The following analytical data revealed that methyl methanethiolsulfonate had been obtained.

Analysis.—Calcd. for $C_2H_6S_2O_2$: C, 19.05; H, 4.76; S, 50.80. Found: C, 19.12; H, 4.84; S, 50.79.

*Example 2*

A clear solution of 6.2 g. (0.056 mole) of twice-distilled ethyl chloromethyl sulfide in 16 g. (0.202 mole) of anhydrous dimethylsulfoxide was prepared in a 50 ml. flask and allowed to stand overnight. The clear solution was converted during this period without elimination of volatile products into a gelatinous mass. The gel material was extracted with three 20 ml. portions of dry chloroform. A chloroform insoluble solid remained in the flask which was filtered, washed with acetone and ether and finally dried. This solid was paraformaldehyde in the amount of 1.6 g. which is 94.5% of the theoretical amount of this material which would be obtained if complete reaction had occurred.

The combined chloroform extracts were evaporated at 39° C./10 mm. leaving a residual yellow oil which was fractionally distilled in a small Claisen flask. There was obtained 5.1 g. of a colorless liquid, B.P. 76–78° C./0.7 mm. Upon redistillation, a colorless liquid was obtained, B.P. 78° C./0.7 mm., $n_D^{20}$ 1.5037. The following analytical data revealed that methyl ethanethiolsulfonate had been obtained. Yield: 65.1%.

Analysis.—Calcd. for $C_3H_8S_2O_2$: C, 25.72; H, 5.71; S, 45.71. Found: C, 26.25; H, 6.14; S, 45.50.

*Example 3*

A solution of 3.49 g. (0.02 mole) of phenyl chloromethyl sulfide (prepared as described in German Patent 845,511) in 13.0 g. (0.1665 mole) of anhydrous dimethylsulfoxide was placed in a 100 ml. flask. The homogeneous mixture was allowed to stand at room temperature for 48 hours. At this point a solid had separated from solution which was collected by filtration and dried. The solid was identified as paraformaldehyde, and a total of 0.60 g. was collected. This represented the theoretical amount of this material which would be obtained if complete reaction had occurred.

The excess dimethylsulfoxide was removed by vacuum distillation leaving a clear residual oil. A small amount (0.1 g.) of crystalline diphenyl disulfide by-product separated from the oil and was removed by filtration leaving 3.6 g. of an oil. The theoretical amount of methyl benzenethiolsulfonate to be expected is 3.76 g. The oil was subjected to distillation under reduced pressure, and a colorless oil was then obtained which had in its infrared spectrum all the characteristics to be expected from methyl benzenethiolsulfonate, e.g. the powerful $SO_2$— absorption at 7.7 and 8.85μ.

What is claimed is:

1. A process for the preparation of an organic thiolsulfonate which comprises reacting a compound having the formula $$RSCH_2Cl$$

wherein R is selected from the class consisting of an alkyl group having 1–18 carbon atoms, a cyclohexyl group, a phenyl group, a chlorophenyl group, a nitrophenyl group and a tolyl group, with
an organic sulfoxide having the formula $$(R')_2S=O$$

wherein R' is an alkyl group having 1–4 carbon atoms, at a temperature in the range of 0° to 180° C.

2. The process of claim 1 wherein dimethylsulfoxide is utilized as the organic sulfoxide.

3. The process of claim 1 wherein a reaction temperature range of about 20° to 75° C. is utilized.

4. A process for the preparation of an organic thiolsulfonate which comprises reacting a compound having the formula $$RSCH_2Cl$$

wherein R is an alkyl group having 1–4 carbon atoms, with an organic sulfoxide having the formula $$(R')_2S=O$$

wherein R' is an alkyl group having 1–4 carbon atoms, at a temperature in the range of 0° to 180° C.

5. The process of claim 4 wherein dimethylsulfoxide is utilized as the organic sulfoxide.

6. The process of claim 5 wherein a reaction temperature range of about 20° to 75° C. is utilized.

No references cited.